(12) United States Patent
Brown

(10) Patent No.: US 6,593,854 B2
(45) Date of Patent: Jul. 15, 2003

(54) SYSTEM OF MONITORING BEARING PERFORMANCE

(75) Inventor: David C. Brown, Northborough, MA (US)

(73) Assignee: GSI Lumonics Corporation, Billerica, MA (US)

( * ) Notice: Subject to any disclaimer, the term of this patent is extended or adjusted under 35 U.S.C. 154(b) by 15 days.

(21) Appl. No.: 09/883,680

(22) Filed: Jun. 18, 2001

(65) Prior Publication Data

US 2001/0052854 A1 Dec. 20, 2001

Related U.S. Application Data

(60) Provisional application No. 60/211,921, filed on Jun. 16, 2000.

(51) Int. Cl.$^7$ ............................................... G08B 21/00
(52) U.S. Cl. .................. 340/682; 340/679; 340/683; 340/514; 340/515; 340/506; 250/231.16; 310/905; 324/662; 342/442; 700/279
(58) Field of Search .................. 340/682, 506, 340/514, 515, 679, 683; 310/90.5, 90; 250/231.16, 231.17; 324/662; 342/442, 424; 700/279

(56) References Cited

U.S. PATENT DOCUMENTS

| | | |
|---|---|---|
| 4,237,454 A | 12/1980 | Meyer |
| 4,326,677 A | 4/1982 | Schippers et al. |
| 4,406,169 A | 9/1983 | Ikeuchi et al. |
| 4,493,042 A | 1/1985 | Shima et al. |
| 4,665,393 A | 5/1987 | Wilder et al. |
| 4,800,512 A * | 1/1989 | Busch ...................... 73/660 X |
| 5,140,849 A | 8/1992 | Fujita et al. |
| 5,221,933 A | 6/1993 | Chandler et al. |
| 5,226,736 A | 7/1993 | Becker et al. |
| 5,381,692 A | 1/1995 | Winslow et al. |
| 5,602,437 A | 2/1997 | Shahamat et al. |
| 5,875,066 A | 2/1999 | Ottesen |
| 6,191,513 B1 | 2/2001 | Chen et al. |
| 6,262,860 B1 | 7/2001 | Ishida |

OTHER PUBLICATIONS

PCT International Search Report dated Dec. 6, 2001 of International Application No. PCT/US01/19496 filed Jun. 18, 2001.

* cited by examiner

Primary Examiner—Daryl Pope
(74) Attorney, Agent, or Firm—Maine & Asmus

(57) ABSTRACT

A system for qualifying and monitoring bearing performance and condition in a rotary servo system. A position error signal is analyzed for signal anomalies that can signify bearing damage. A DC offset ramp is applied to the position error signal to test whether the anomaly is angular position dependent. The anomaly is associated with the corresponding command signal value and range of values to calculate the angular position and range of the apparent bearing damage. The amplitude of the anomaly is measured and associated with a relative degree of bearing damage.

15 Claims, 3 Drawing Sheets

SYSTEM OF MONITORING BEARING PERFORMANCE

This application relates and claims priority for all purposes to pending U.S. Prov. Appl. application Ser. No. 60/211,921 filed Jun. 16, 2000, by the same inventor.

TECHNICAL FIELD OF THE INVENTION

The present invention relates to the monitoring of galvanometer bearing performance; and more particularly to analyzing the response to position commands for information about bearing condition.

BACKGROUND OF THE INVENTION

One of the fundamental operating components of galvanometer systems are bearings. Bearings and the peripheral components allow the high speed and precision operation of scanners and similar devices.

However, bearings are subject to stress and damage from the physical contact and environmental conditions. As the bearings begin to wear or develop divets, the tolerance of the entire system degrades. Other causes for degradation includes the bearing interface with the race assembly. Due to the degrading performance, eventually the system falls out of tolerance and requires maintenance. In some situations, bearing failure can shut down a critical manufacturing line or other high priority operation. Parts and personnel may not be at beckon call to repair the system.

In addition, due to the precise manufacturing requirements, the bearings may suffer from design problems or manufacturing defects that do not comply with the system requirements. Such errors require a means to detect and quantify the error in order to notify the manufacturer and maintain the high quality of the product.

There have been some attempts to alleviate the aforementioned problems. In U.S. Pat. No. 4,326,677, a monitoring circuit for detecting metallic contact between the high-speed spindle and the housing is disclosed. Such a condition alerts personnel to this condition to avoid more serious problems.

Another monitoring circuit is shown in U.S. Pat. No. 5,226,736, wherein sensors measure the dimensions of cracks or pits in the race or between the race and rings. The data is communicated to the processing center that analyzes the data for fault conditions.

What is needed is a means of detecting bearing tolerance changes over time. Such a system would be able to detect variations in the operating performance of a galvanometer bearing set and alert operators to potential problems. Such a monitoring and detection system must be simple and cost-effective to use and operate, and be passively transparent such that it does not interfere with normal operation of the galvanometer device or system. One of the advantages of such a system would be to incorporate a tolerance margin that could be used by maintenance personnel to anticipate failures in advance, so that the necessary replacement or repair parts would be in stock and the unit scheduled for downtime and service prior to an actual failure.

SUMMARY OF THE INVENTION

Accordingly, an object of the present invention is to provide a methodology for the qualifying and monitoring of the bearings of rotary servo systems, such as galvanometer scanners, for bearing performance and condition. A position error signal is measured and recorded as compared to the command angle. Certain anomalies that may be outside the normal threshold limits of amplitude are isolated and analyzed. The position error signal is a difference signal and can therefore be magnified to provide highly accurate measurements.

Another object is to isolate the bearing damage from electrical contamination or other signal conditions that are not angular position dependent. A DC offset ramp is applied to the position error signal and analyzed for anomalies in the error signal that move coherently with the position error signal, indicating positional dependence and a likelihood of bearing damage.

A further object is to gather additional information from the signal processing. The amplitude of the anomaly is a measure of the degree of bearing damage. The width or duration of the anomaly as compared to command signal range is a measure of the angular range of the damaged region. The angular position of the damaged region is measured by the offset voltage at which it appears, as compared to the range over which the device is operated.

A further object of the invention is to incorporate predetermined tolerance limits such that as the bearing damage reaches a specific degree of damage, an alarm would alert the user for scheduling repair/replacement and procurement of the required parts and equipment before a catastrophic, unscheduled failure occurs.

Another object is to qualify the bearings of individual servo devices or types of devices, by measuring the characteristics and storing the information for later tracking and comparison. Such information provides a means of tracking performance of a particular set of bearings and also as a means of approving or accepting a lot of bearings from a manufacturer. In essence, it provides a standard for acceptability and a baseline for operational evaluation.

And yet a further object is to qualify other elements of the device such as lubricants, ball sphericity, race finish, and similar parameters affecting the functioning of the bearings. Such parameters would be analyzed and the information used for assessing the improvement or degradation of performance provided by design or configuration changes.

The position error signal of a servo system is commonly measured as part of a setup or diagnostic routine. Such diagnostics can be used not only to verify system performance as part of final random inspection, but also to qualify components such as bearings or lubricants. The position error signal enables the manufacturer to quantify the acceptance level and establish a means for checking component consistency.

The position error signal is not generally measured by the operational controller elements of rotary servo systems such as those of scanners. However the present invention indicates the importance of the position error signal for real time monitoring of bearing condition, and it is a requirement of the invention to have the position error signal enabled in some manner such as within the scan controller of a galvanometer scanner.

Still other objects and advantages of the present invention will become readily apparent to those skilled in this art from the following detailed description, wherein only a preferred embodiment of the invention is described, simply by way of illustration of the best mode contemplated for carrying out the invention. As will be realized, the invention is capable of other and different embodiments, and its several details are capable of modifications in various obvious respects, all without departing from the invention.

BRIEF DESCRIPTION OF THE DRAWINGS

The present invention will be readily understood by the following detailed description in conjunction with the accompanying drawings, wherein like reference numerals designate the elements describe, and in which.

DESCRIPTION OF THE PREFERRED EMBODIMENT

Figure 1:
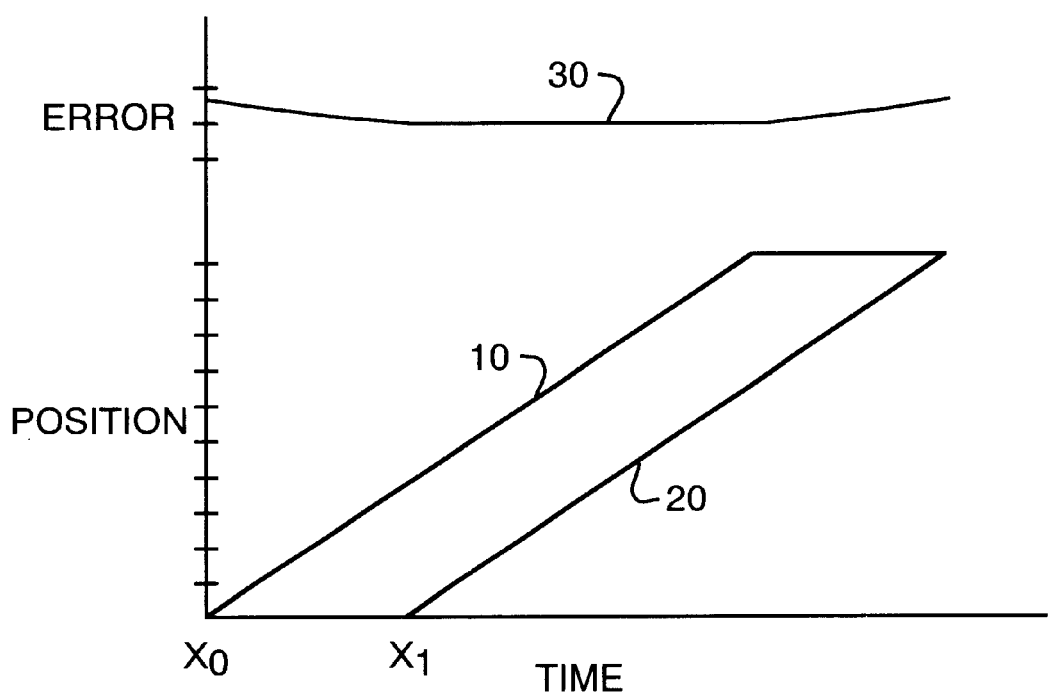
FIG. 1 shows a linear command signal, and ideal position signal and position error signals.

The graphs illustrated are not to scale, but the information conveyed in the figures and description will be readily understood by those skilled in the art. In FIG. 1, the ideal position/time command signal 10 and position signal 20 of a rotary servo system are illustrated. The ideal command signal 10 is a linear ramp starting at $t_0$, commanding a constant velocity movement or position change across the angular range of the device. The ideal position signal 20, neglecting lag time, is also a linear ramp commencing at $t_1$. The difference between $t_1$ and $t_0$ is the lag or delay time that occurs between when the command signal is issued and when the system responds. The ideal position error signal 30, a ramp from $t_0$ to $t_1$ representing the accumulating lag time of response, is after $t_1$ a horizontal line representing the constant lag time value with no error or noise in the ideal signals.

Figure 2:
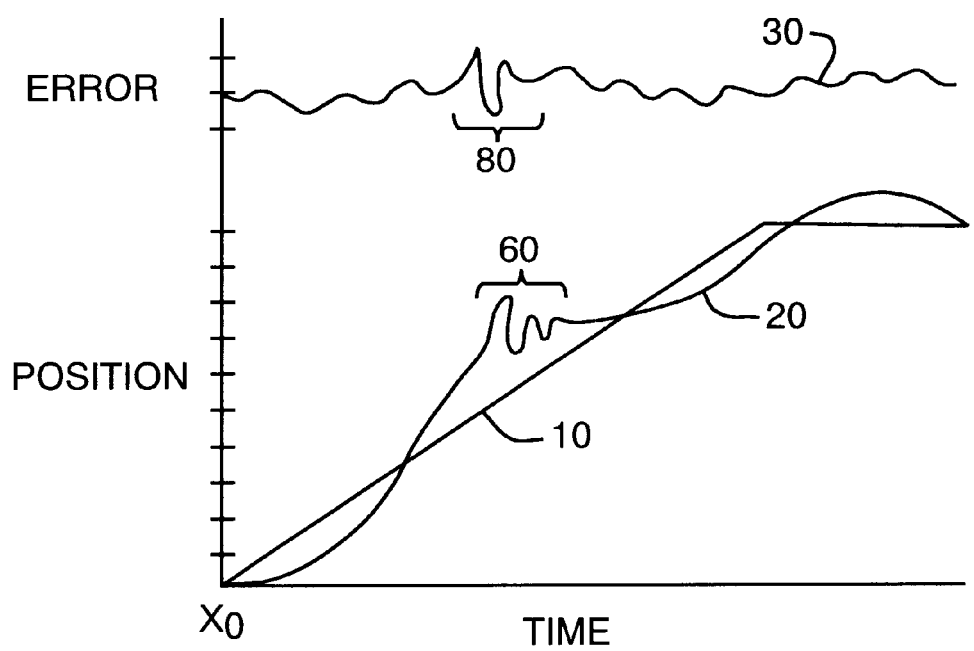
FIG. 2 illustrates a more practical representation of a command signal, position signal and position error signal, with an anomaly occurring in the position error signal.

A more realistic depiction of the signals is shown in FIG. 2. The command signal is still a linear ramp 10, but the non-ideal position signal 40 now shows an oscillation or irregular curvature in its response, representative of the inevitable deviations in rotary servo devices from the ideal. The non-ideal position error signal 50 has some amplitude that represents some noise components. The noise is typically attributable to roughness in the bearings or races, properties of the lubricants and similar mechanical sources. However it is also possible that the source of contamination is electrical in nature, such as white noise. A large change in the position signal 60 would also represent a significant change in the position error signal 50, whether the change was the result of a divet in the bearing or some electrical noise error.

Figure 3:
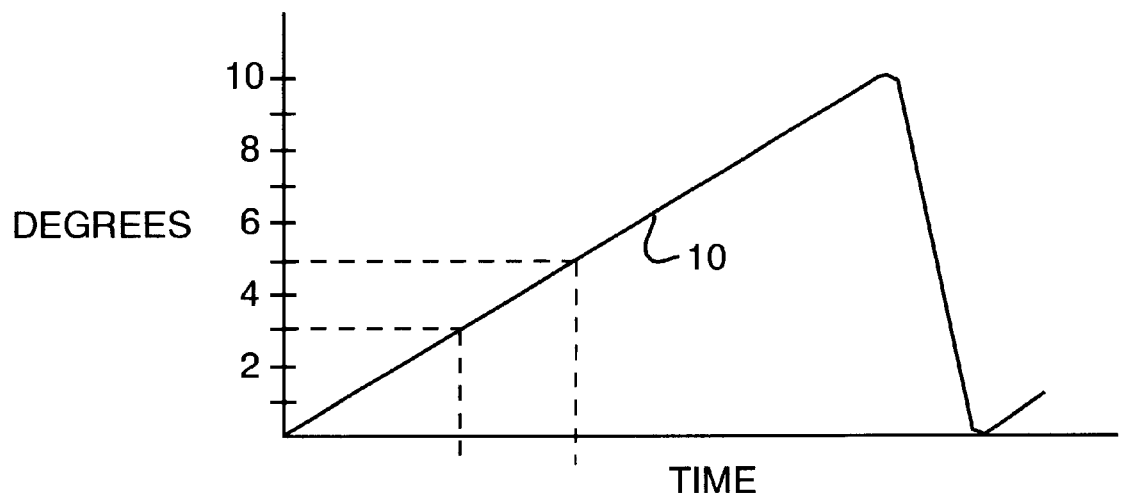
FIG. 3 illustrates the angular range of the servo device associated with the command signal angular position range.

Referring to FIG. 3, and looking only at the command signal 10 in relation to the position error signal 50. The command signal 10 is a representation of the commanded range of the shaft rotation, such as from 0 to 10 degrees of rotation. In the typical scanner operation the scanner rotation is generally limited to a small range of degrees; the shaft continually tracking the command signal within those few degrees.

Figure 4:
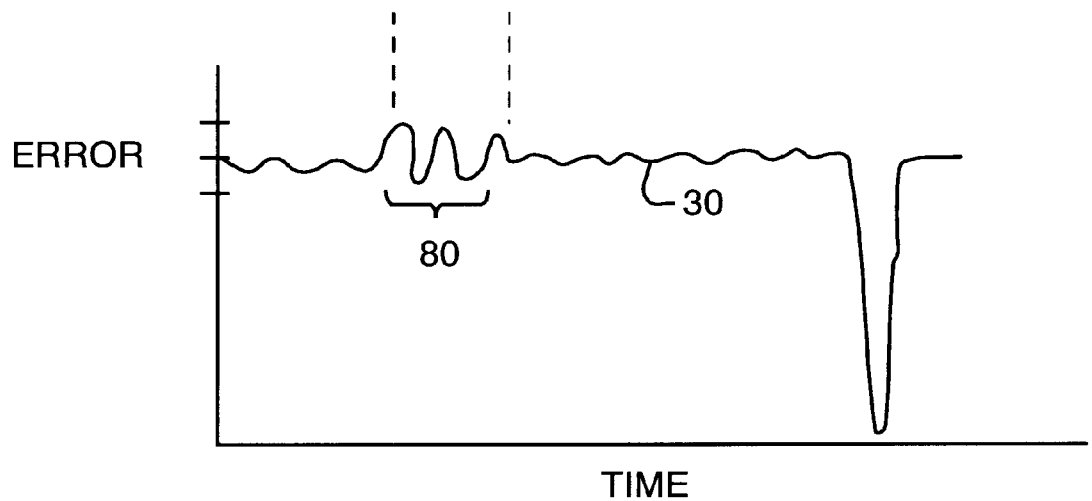
FIG. 4 shows the position error signal with its anomaly being associated with related angular position values of the command signal of FIG. 3.

As shown in FIG. 4, the perturbation or anomaly apparent at region 80 of position error signal 50 occurs at some associated angular position of the command signal 10. Because the position error signal is a difference signal, it is possible to amplify the signal and obtain more accurate measurements of the anomaly with respect to the associated angular position of the command signal as well as of the amplitude of the anomaly.

In this example, anomaly 80 in the position error signal 50 occurred between 3 and 5 degrees of the angular command. This large change can be analyzed and processed to determine several attributes of anomaly 80.

The amplitude of the anomaly can be directly correlated to the amount or degree of bearing damage. A very large amplitude that is outside of acceptable thresholds will alert maintenance personnel or may be used to trigger pre-programmed self-correction steps within the operating parameters of the servo system including self shutdown.

The subset of command position signal range over which the anomaly occurs represents the angular extent of the damaged region. In this example, the width of the damage extends 2 degrees across the face of the bearing contact surface.

Figure 5:
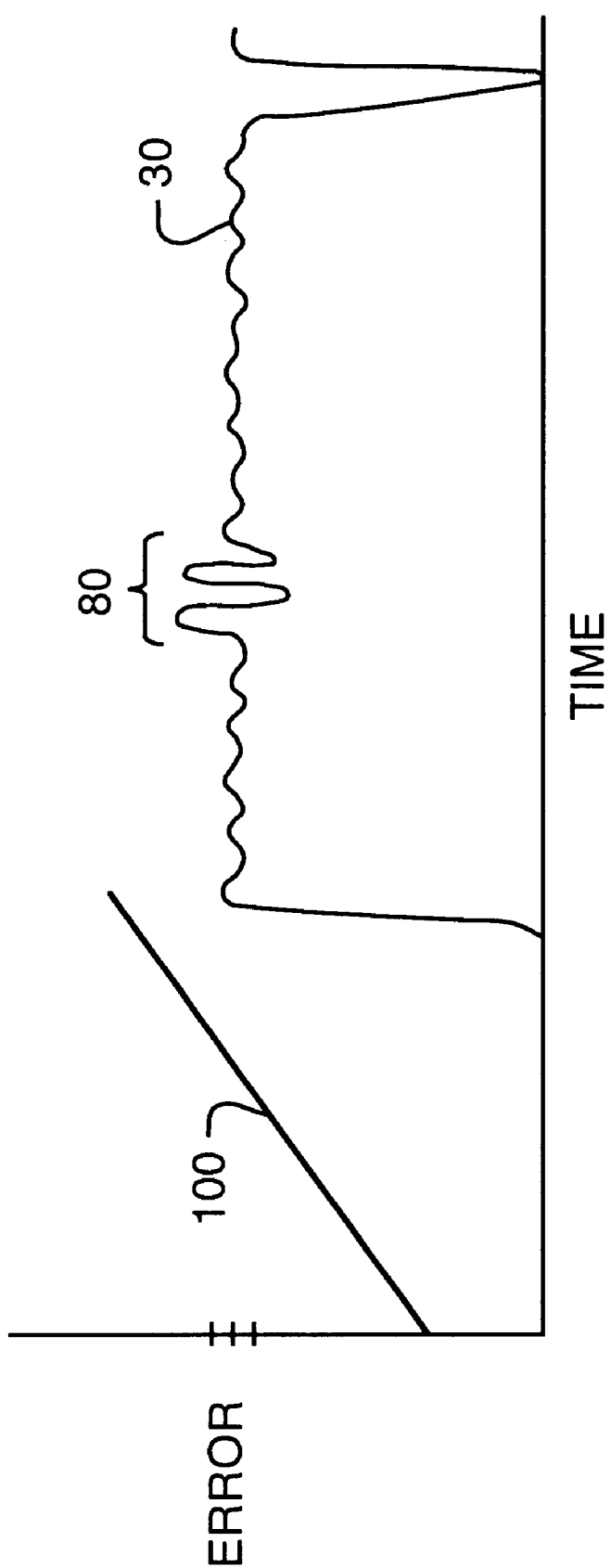
FIG. 5 illustrates the application of a DC offset ramp signal and its effect on a position error signal.

However, anomaly 80 might also be attributable to a source of electrical signal or noise contamination unrelated to the exact angular position of the servo shaft and bearings, so it is necessary to distinguish between mechanically induced and mechanically unrelated electrical errors. In accordance with the invention, this is accomplished by applying a DC offset voltage ramp to the position error signal and noting its effect on the timing of the anomaly within the position error signal. As shown in FIG. 5, a DC offset ramp signal 100 is applied to the position error signal 50, which causes the position error signal to be shifted or offset in time. Thus, anomaly 80 will also be offset in time, shifting with the position error signal 50, if it is attributable to a mechanical problem as opposed to an unrelated electrical problem. In other words, DC offset ramp 100 can be used to test anomaly 80 for being related to the angular position of the shaft, rather than a positionally unrelated source.

In light of the figures and description of the preferred embodiment, other embodiments within the scope of the claimed invention will be readily apparent to those skilled in the art. For example, there is a method of monitoring bearing performance in other rotary servo devices, consisting of the steps of applying a command signal for position change to the servo device, generating an actual position signal by use of an angular position sensor, comparing the command signal and the position signal and from that generating a position error signal. The position error signal is then evaluated for anomalies in amplitude not apparent in the balance of the signal, that would suggest something out of the ordinary is occurring at that angular position. The anomaly is measured in amplitude and tested for angular position dependence in the manner described. If it is position dependent, the amplitude is equated according to a predetermined table based on prior analysis, to an amount or degree of apparent bearing damage.

The method may include the steps of associating the occurrence of each anomaly with a relative nominal value of command signal to command signal range in angular terms, for example an occurrence appearing at two degrees into a ten degree available range of angular motion, for calculating the angular position of bearing damage. Expanding on this aspect of the invention, the angular range of the bearing damage is similarly calculable by more closely inspecting the duration of the anomaly to ascertain the associated upper and lower limits of the command signal and range of the limits relative to the full command signal range.

The method may include actuating a system fault signal when the amount of bearing damage exceeds a pre set threshold amount, for either manual or automatic response which may include maintenance warnings or even system shutdown. The testing for angular position dependence can be done by applying an offset voltage ramp signal to the position error signal generator, and observing whether the anomaly is shifted with respect to its position within the position error signal. If it is, then the anomaly is angular position dependent, and more likely associated with bearing damage. Finally, the method may be employed using an angular position command controller incorporated into the device or connected to its servo drive unit and angular position sensor.

As another example, consistent with the above descriptions, the rotary servo device can be a galvanometer scanner to which the same methodology is applied in order to qualify and monitor scanner bearing performance and condition. The method may employ the scan controller and enablement of a position sensor and position error signal generator.

These and other examples are embodied in the claims that follow, consistent with the specification and figures provided.

I claim:

1. A method of monitoring bearing performance in a rotary servo device, comprising the steps of:

applying a command signal for position change to said servo device, generating an actual position signal for said servo device, comparing said command signal and said position signal and therefrom generating a position error signal, evaluating said position error signal for anomalies in amplitude, testing said anomalies for angular position dependence, measuring said anomalies for amplitude, and equating said amplitude of said anomalies with an amount of bearing damage.

2. A method of monitoring bearing performance in a rotary servo device according to claim 1, further comprising the steps of associating the occurrence of each said anomaly with a relative value of said command signal to command signal range and therefrom equating said anomalies with an angular position of said bearing damage.

3. A method of monitoring bearing performance in a rotary servo device according to claim 1, further comprising the steps of associating the occurrence of each said anomaly with the relative range of values of said command signal to said command signal range and therefrom equating said occurrence with an angular range of said bearing damage.

4. A method of monitoring bearing performance in a rotary servo device according to claim 1, further comprising the steps of actuating a system fault signal when said amount of bearing damage exceeds a pre set threshold amount.

5. A method of monitoring bearing performance in a rotary servo device according to claim 1, said testing for angular position dependence comprising the steps of:

applying an offset voltage ramp to said position error signal, and observing whether said anomaly is laterally shifted with respect to its position within said position error signal.

6. A method of monitoring bearing performance in a rotary servo device according to claim 1, said method employing an angular position command controller and angular position sensor.

7. A method of monitoring bearing performance in a galvanometer scanner, comprising the steps of:

applying a command signal for position change to said scanner, generating an actual position signal for said scanner, comparing said command signal and said position signal and therefrom generating a position error signal, evaluating said position error signal for anomalies in amplitude, testing said anomalies for angular position dependence, measuring said anomalies for amplitude, and equating said amplitude of said anomalies with an amount of bearing damage.

8. A method of monitoring bearing performance in a galvanometer scanner according to claim 7, further comprising the steps of associating the occurrence of each said anomaly with a relative value of said command signal to command signal range and therefrom equating said anomalies with an angular position of said bearing damage.

9. A method of monitoring bearing performance in a galvanometer scanner according to claim 7, further comprising the steps of associating the occurrence of each said anomaly with the relative range of values of said command signal to said command signal range and therefrom equating said occurrence with an angular range of said bearing damage.

10. A method of monitoring bearing performance in a galvanometer scanner according to claim 7, further comprising the steps of actuating a system fault signal when said amount of bearing damage exceeds a pre set threshold amount.

11. A method of monitoring bearing performance in a rotary servo device according to claim 7, said testing for angular position dependence comprising the steps of:

applying an offset voltage ramp to said position error signal, and observing whether said anomaly is laterally shifted with respect to its position within said position error signal.

12. A method of monitoring bearing performance in a rotary servo device according to claim 7, said method employing an angular position command controller and angular position sensor.

13. A method of monitoring bearing performance in a galvanometer scanner, comprising the steps of:

applying a command signal for position change to said scanner, generating an actual position signal for said scanner, comparing said command signal and said position signal and therefrom generating a position error signal, evaluating said position error signal for anomalies in amplitude, testing said anomalies for angular position dependence, measuring said anomalies for amplitude, associating the occurrence of each said anomaly with the relative values and range of said relative values of said command signal to command signal range and therefrom equating said anomalies with an angular position and range of said bearing damage, equating said amplitude of said anomalies with an amount of bearing damage, and actuating a system fault signal when said amount of bearing damage exceeds a pre set threshold amount.

14. A method of monitoring bearing performance in a galvanometer scanner according to claim 13, said testing for angular position dependence comprising the steps of:

applying an offset voltage ramp to said position error signal, and observing whether said anomaly is laterally shifted with respect to its position within said position error signal.

15. A method of monitoring bearing performance in a galvanometer scanner according to claim 13, said method employing a scan controller and angular position sensor.

* * * * *